| United States Patent
Benner, Jr. et al.

[15] 3,692,055
[45] Sept. 19, 1972

[54] METHOD FOR UNIFORM DISTRIBUTION OF GASES IN AN ANNULUS AND APPARATUS THEREFOR

[72] Inventors: Floyd E. Benner, Jr., Scott Township, Pittsburgh, Pa.; Clifford E. Loehr, Akron, Ohio

[73] Assignee: PPG Industries, Inc.

[22] Filed: Dec. 23, 1969

[21] Appl. No.: 884,770

Related U.S. Application Data

[60] Continuation of Ser. No. 669,109, Sept. 20, 1967, abandoned, which is a division of Ser. No. 360,937, April 20, 1964, Pat. No. 3,467,498.

[52] U.S. Cl..............137/604, 285/133 R, 285/156, 138/114
[51] Int. Cl.............................................F16l 41/00

[58] Field of Search..............137/604, 602; 138/114; 106/300; 285/156, 132, 133 R; 98/70, 78, 115; 417/196

[56] References Cited

UNITED STATES PATENTS 2,722,372  11/1955  Edwards......................230/95

Primary Examiner—Robert G. Nilson
Attorney—Chisholm and Spencer

[57] ABSTRACT

The production of pigmentary metal oxides, e.g., titanium dioxide, by vapor phase oxidation of the corresponding metal halides, e.g., titanium tetrachloride, is described. Method for providing effective mixing of reactant gases is discussed and a particular method for delivering reactant gases to the reaction zone in a uniform manner is described.

5 Claims, 4 Drawing Figures

PATENTED SEP 19 1972  3,692,055

INVENTORS
FLOYD E. BENNER JR.
CLIFFORD E. LOEHR
BY Chisholm and Spencer
ATTORNEYS

METHOD FOR UNIFORM DISTRIBUTION OF GASES IN AN ANNULUS AND APPARATUS THEREFOR

CROSS REFERENCE TO RELATED APPLICATIONS

The present application is a streamlined continuation application of our U. S. application, Ser. No. 669,109, filed Sept. 20, 1967, now abandoned, which application is a divisional application of our U.S. application Ser. No. 360,937, filed on Apr. 20, 1964, now U. S. Pat. No. 3,467,498.

BACKGROUND OF THE INVENTION

This invention relates to novel apparatus and process for the distribution of a gas or gases. More specifically, this invention relates to novel apparatus and process for the distribution of a gas or gases in the production of metal oxides, particularly pigmentary titanium dioxide, by a vapor phase oxidation process; that is, the reaction of a metal halide in the vapor phase with an oxygenating or oxygen-containing gas.

In the production of titanium dioxide by the vapor phase oxidation of titanium tetrahalide either in the presence or absence of a fluidized bed, the titanium tetrahalide is oxidized by reaction in the vapor phase state with oxygen or an oxygen-containing gas in a relatively confined area maintained at a temperature above 700° C. in a range of about 800° to 1,200° C., preferably not higher than 1,600° C.

An important aspect of efficiently producing or making pigmentary titanium dioxide is the mixing of vaporous or gaseous streams, particularly reactants. In the various vapor phase oxidation processes, it is especially useful and advantageous to introduce the reactant gas streams of titanium tetrahalide and oxygen-containing gas separately into the reaction zone by means of a series of concentric tubes or annuli. Reference is made to FIG. II of U. S. Pat. No. 2,791,490 issued to Willcox, and U.S. Pat. No. 2,968,529 issued to Wilson.

In more sophisticated processes, such as disclosed in U. S. Pat. No. 3,068,113 issued to Strain et al., and U. S. Pat. No. 3,069,281 issued to Wilson, additional gas streams, e.g., inert gases, are separately introduced into the reaction zone via additional concentric tubes. In such arrangements, the number of concentric tubes employed will generally be a function of the number of gas streams to be introduced into the reaction zone, although it may sometimes be desirable to introduce several gases through a single tube.

Since heat is frequently added to the vaporous reactants or other gases within these tubes, e.g., by reacting CO with $O_2$, the concentric arrangement of tubes may be commonly called a burner and the tubes referred to as burner tubes. Hereinafter, the term, "gas introduction tubes", will be employed so as not to limit the invention solely to burner arrangements; that is, the present invention is intended to be employed in conjunction with any arrangement of concentric flow path particularly used in the production of pigmentary metal oxide.

In accordance with this invention, the various gas streams emitted from the various annuli or flow paths formed by concentrically arranged tubes having coextensively parallel walls in a predictable uniform, concentric flow pattern and in a direction of flow parallel to the axis of the center of the arrangement or assembly of the concentric gas introduction tubes. By so uniformly and axially emitting the gases from the annuli or concentric flow paths, it is possible to operate a pigmentary $TiO_2$ vapor phase oxidation process continuously for long periods of time without oxide scale or growth forming on the lips of the gas introduction tubes extending into the reaction chamber.

However, when the process is not operated in accordance with this invention, e.g., when one or more of the gas streams is emitted at an angle, then oxide scale or growth quickly forms on the lips of the gas introduction tubes eventually causing plugging and shutdown. Furthermore, during the growth buildup, part of the scale will break off in the form of coarse, non-uniform particles which hinder the formation and recovery of a pigmentary metal oxide. Likewise, the growth buildup diverts the flow of the gases and hinders mixing to such an extent that the formation of pigmentary metal oxide is further prevented.

SUMMARY OF THE INVENTION

In the practice of this invention, such scale buildup or burner growth is prevented and highly-dispersed pigmentary metal oxide, particularly titanium dioxide, of small, uniform particle size and having improved tinting strength can be produced by a continuous vapor phase oxidation process.

In the present invention, the inert and/or reactant gas stream is introduced to the annulus or annuli in a manner such that the gas is distributed over the entire cross-sectional area of the annulus and is emitted from the burner into the reaction zone in a predictable uniformly concentric flow pattern with a direction of flow parallel to the axis of the burner assembly; that is, the present technique makes possible the controllably metering and mixing of the various gas streams introduced into the reactor in a predictable, useful, and advantageous manner.

More particularly, the gas stream is introduced to the annulus by means of a wide angle distribution tube which is elongated and connected substantially transverse to the burner assembly, the end of the tube connected to the burner assembly being substantially wider and greater in mean diameter or width and cross-sectional area than the other end. Thus, as the gas stream flows through the tube, the gas increases in volume, increases in pressure, and decreases in linear velocity.

BRIEF DESCRIPTION OF THE DRAWINGS

The invention will be better understood by reference to the drawing and the figures thereon.

In the drawing.

DETAILED DESCRIPTION

Figure 1:
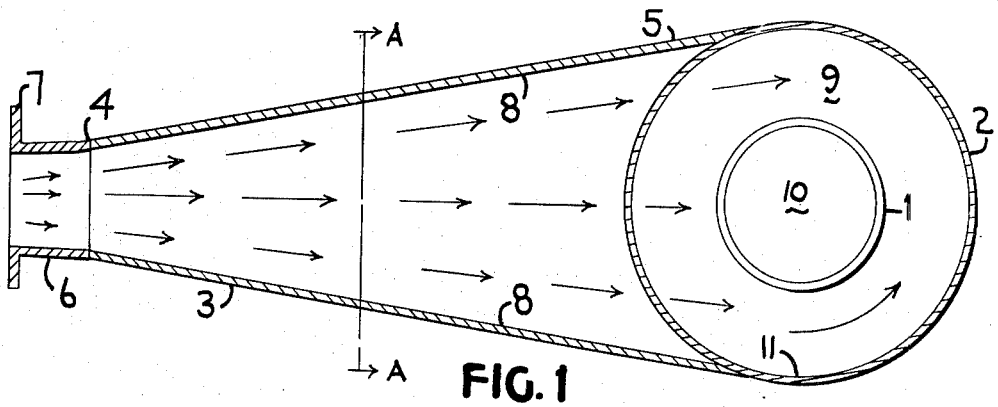
FIG. 1 is a cross-section through a plan view of a preferred embodiment of apparatus to be used in the present process invention.

More specifically, FIG. 1 discloses wide-angle gas distribution apparatus 3 employed in conjunction with two concentric gas introduction tubes, 1 and 2, forming a space or annulus 9 that is closed at one end and open at the other end.

The wide-angle apparatus 3, as shown in FIG. 1, comprises an elongated tube or conduit which has a more narrow width and cross-sectional area at one end 4 thereof in relation to opposite end 5, the cross-sectional area and mean diameter uniformly increasing from end 4 to end 5. The narrow end 4 may be attached to any suitable gas supply means by appropriate connecting means such as flange 7 and coupling 6, said narrow end of said conduit and said gas supply means having the same cross-sectional area and shape at the connection therebetween.

Figure 2:
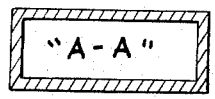
FIG. 2 is a cross-section through A—A of FIG. 1.

The cross-section of the apparatus 3 is shown in FIG. 2 as being rectangular. However, other cross-sectional shapes, e.g., circular, elliptical, are deemed to be within the skill of a mechanic in the art and are considered to be within the scope of this invention.

The end 5 is attached by any suitable means, e.g., welding, to the pipe 2 and annulus or space 9 at a location closer to the closed end than the open end of said space. Although the end 5 is shown in FIG. 1 as being attached externally of pipe or tube 2, it could just as well be attached internally. In the preferred practice of this invention, the end 5 is attached to the pipe 2 in a manner such that the internal side walls 8 are substantially tangential to the inside wall of pipe 2, such that a portion of the gas stream introduced through tube 3 to annulus 9 is substantially tangential to the inside wall of burner tube 2 and outside wall of tube 1.

Although it is preferred that the tube 3 be attached to pipe 2 at the maximum diameter, such that the maximum diameter of both is about the same, tube 3 may be attached at a point such that its maximum diameter is less than that of pipe 2 providing its maximum diameter still exceeds that of pipe 1.

In the preferred arrangement disclosed in FIG. 1, a gas stream is introduced through coupling 6 at end 4. As the gas stream continues through the uniformly diverging passage of apparatus 3, the gas stream expands, increases in volume, increases in pressure and diverges, the linear velocity of the gas decreasing and the gas thereby distributing uniformly throughout the cross-sectional area of annulus 9 between tubes 1 and 2.

Figure 3:
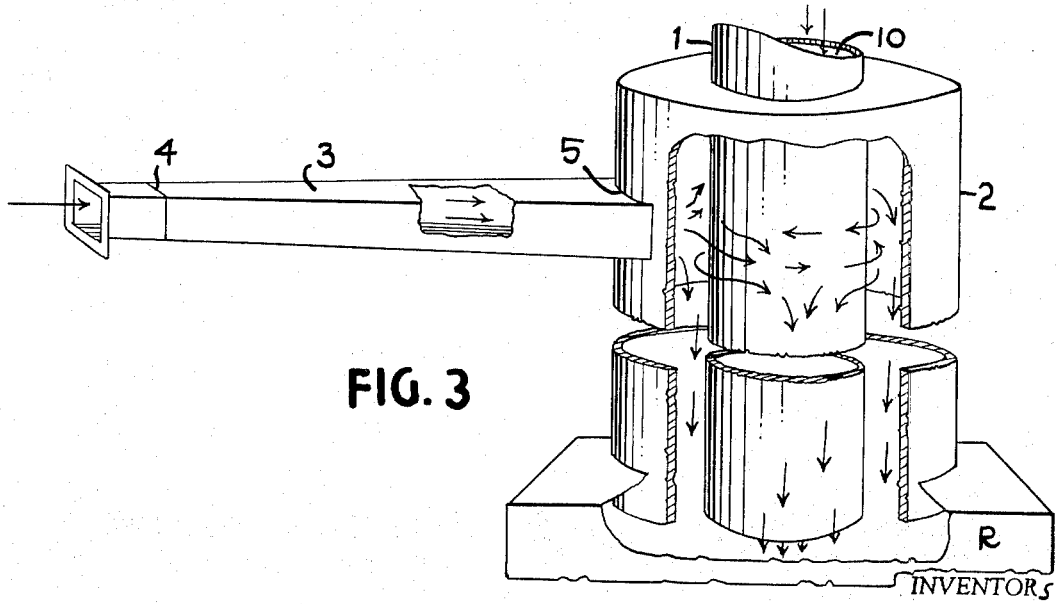
FIG. 3 is a three-dimensional view with cut-aways of the embodiment of FIG. 1.

As shown in FIG. 3, the gas stream continues in a downwardly direction into a reactor R and is emitted from the flow path or annulus 9 into the reactor in a uniformly concentric predictable flow pattern parallel to the common axis of the burner tubes 1 and 2.

Where the elongated tube connected to the annulus is of constant cross-sectional dimensions, then there is no spreading or diverging of the gas flow pattern, nor a decrease in the gas velocity as the gas angularly approaches the concentric gas introduction tube assembly, and accordingly, the gas stream is not uniformly and predictably distributed within the annulus but flows downwardly through the annulus on the side opposite to the side at which it originally entered the annulus. As the stream enters into the reactor, it immediately flows at an angle into adjacent gas streams thereby hindering the mixing and causing oxide growth immediately to form at the lips or exit openings of the tubes.

Figure 4:
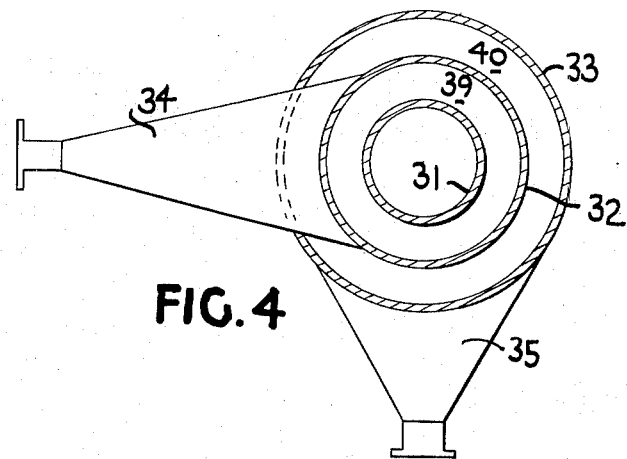
FIG. 4 is a plan view showing a double embodiment of FIG. 1.

FIG. 4 represents a double embodiment of the process of FIG. 1 where three concentric gas introduction tubes 31, 32, and 33 are employed with wide-angle distribution tubes 34 and 35 being connected respectively to annuli 39 and 40.

Although it is preferred that the wide-angle gas distribution tube 3 be substantially transverse to the common axis of the concentric tubes (such as shown in FIG. 3), it is equally possible for the tube to be connected at an angle ranging from 10° to 170°, preferably within 45° to 135°.

In the practice of this invention, the diameter of the annulus should be 1.5 to 40 times, preferably six to 14 times, the smallest width of the distribution tube, such that the mean diameter of the gas stream gradually expands and increases by a multiple ranging from 1.5 to 40 within a linear distance of 1 to 20 feet, such that the gas stream expands and diverges 5° to 90°, preferably 10° to 25°, along at least one axis of the distribution tube.

By diameter, it is also intended mean or average diameter or width where the distribution tube has a rectangular cross-section or geometric shape other than circular.

The cross-sectional area of the gas stream within the distribution tube should increase by a multiple of about 1.5 to 1,600 times within a distance of 20 feet based on the mean diameter.

Although the present process has been described and illustrated as comprising a wide-angle distribution tube which uniformly and constantly increases in cross-sectional area, it is to be understood that this may be accomplished by a series of steps; that is, a constant increase in diameter and cross-sectional area is herein defined as also comprising a process wherein the gas is gradually expanded in a series of distinct steps in which case the angle of divergence and expansion is measured from the initial diameter to the final diameter.

The vaporous metal halide reactant, e.g., titanium tetrahalide, is preferably introduced into the reactor chamber at a theoretical velocity of 500 to 60,000 feet per minute calculated at 150° C. and 1 atmosphere. The oxygen-containing stream is introduced at 200 to 50,000 feet per minute calculated as pure oxygen gas at 0° C. and 1 atmosphere. The inert gas, e.g., chlorine, is introduced at 50 to 6,000 feet per minute, calculated at 0° C. and 1 atmosphere.

The cross-sectional area of the gas introduction tubes and annuli is preferably circular. However, it is also possible to employ other geometric shapes and designs in conjunction with the present process, this being deemed to be within the skill of a mechanic in the art.

Likewise, the present invention may be practiced to introduce gas at an angle to the center gas introduction or burner tube, e.g., tube 10 in FIGS. 1 and 3. In practice, it is usually preferred to introduce the gas stream, e.g., oxygen, from the top of the tube assembly. However, in some instances, it is necessary to introduce the gas stream at an angle in which case the present invention is valuable to prevent swirling of the gas stream; the swirling of the stream also causing poor mixing and the formation of poor quality pigmentary metal oxide.

In a further modification of the present process, additional gas or vapor may be introduced into the wide-angle distribution tube at an angle thereto. Such gas may be the same or different from that introduced at end 4.

The temperatures of the various gases introduced through the concentric tubes may range from 100° to 2,500° C., $TiCl_4$ preferably being below 500° C., whereas the oxygen or an inert gas may be preheated by the combustion of a fuel, CO, or sulfur-containing compound to temperatures in excess of 1,500° C., or in excess of 2,000° C. where a plasma arc is employed.

In a further embodiment of the invention, the gas is first expanded from a small diameter pipe into a larger pipe of constant diameter, the expanded gas stream having an immediate decreased velocity at which it is fed into the annulus or concentric flow path. The rate of expansion must be such that the rate of gas flow is sufficiently diminished and decreased to a point at which gas distribution is effected. The diameter of the large pipe is preferably 1.5 to 20 times that of the smaller pipe ranging from the minimum diameter to the maximum diameter, preferably the latter, of the annulus into which the gas is flowing.

The term "inert gas" as employed herein means any gas which is inert to the reaction of the metal halide and oxygen. Examples of such inert gases, not by way of limitation, are argon, nitrogen, helium, krypton, xenon, chlorine, carbon dioxide, or mixtures thereof. Carbon monoxide may also be introduced in place of, in addition to, or mixed with an inert gas as defined hereinabove, the carbon monoxide being introduced as a means of providing heat to the reaction zone for the sustaining of the reaction, the CO reacting with the oxygen to form $CO_2$. Likewise, sulfur-containing compounds, as disclosed in copending U. S. application Ser. No. 15,300, now U. S. Pat. No. 3,105,742, may be introduced through the annulus or annuli alone or mixed with a gaseous reactant or inert gas. Thus, any gaseous stream, e.g., metal halide, oxygen, inert gas, carbon monoxide, sulfur-containing compounds, natural gas, or mixtures of same, may be added to the annulus or annuli of the concentric tubes by means of this inventive process.

Although this invention has been illustrated in FIGS. 1 and 4 as comprising two and three concentric burner tube arrangements, it is not to be so limited and may be used in conjunction with any number of concentric tubes and annuli. Thus, in the production of pigmentary titanium dioxide, it is possible to use as many as six or eight concentric tubes with five to seven annuli, four or more gases, and six or more streams, some of the gases being introduced in separate streams through two or more annuli.

The following are typical examples.

EXAMPLE I

Using the process of FIG. 1, 36 gram-moles per minute of oxygen at 1,100° C. are continuously fed through internal tube 1 having an internal diameter of 5 inches while 32 gram-moles per minute of titanium tetrachloride at 500° C. are continuously fed into annulus 9 having a maximum internal diameter of 9 inches through the wide-angle distribution tube 3 having a length of 2 feet with internal widths of 1 inch and 9 inches, respectively, at the ends 4 and 5.

Vaporous aluminum trichloride at 300° C. is introduced into the $TiCl_4$ stream at the rate of about 60 to 130 grams per minute before the $TiCl_4$ is introduced into annulus 9. Liquid $SiCl_4$ is also added to the $TiCl_4$ stream at the rate of about 0.18 gram-moles per minute before the introduction of the $TiCl_4$ into the annulus through distribution tube 3.

The process is operated continuously for 168 hours. A typical $TiO_2$ product sample during the run has an average tinting strength (Reynolds Scale) of 1,730.

For comparison purposes, the conditions above are repeated with a standard 1½ inch Sch. 40 pipe, 2 feet in length, being substituted for the wide-angle distribution tube 3. After 30 minutes of operation, the tubes 1 and 2 plug at the reactor end thereof, due to oxide growth and buildup. A typical $TiO_2$ product sample during the run has an average tinting strength (Reynolds Scale) of 1,350.

EXAMPLE II

By using the double embodiment of FIG. 4, 38 gram-moles per minute of oxygen at 1,150° C. is continuously fed through internal tube 31, having an internal diameter of 4 inches while 32 gram-moles per minute of titanium tetra-chloride at 525° C. are continuously fed through a wide-angle distribution tube 35 having a length of 1½ feet with internal widths of 2 inches and 12 inches, respectively, at the ends, the maximum diameter of the annulus 40 being 12 inches.

Chlorine at 400° C. is continuously fed at a rate of 5 to 7 gram-moles per minute into annulus 39 having a maximum diameter of 7 inches, the chlorine being introduced through wide-angle distribution tube 34 having a length of 2½ feet with internal widths of 2 inches and 7 inches, respectively, at the ends.

Sixty to 130 grams per minute of vaporous aluminum trichloride at 300° C. is introduced into the $TiCl_4$ stream before it is fed into annulus 40. Liquid silicon tetrachloride at the rate of 0.19 gram-moles per minute is also added to the titanium tetrachloride before its introduction through distribution tube 35.

The process is continuously operated for 240 hours. A typical product sample during the run has an average tinting strength (Reynolds Scale) of 1770.

For comparison purposes, the conditions above are repeated without the wide-angle distribution tubes 34 and 35, the chlorine and the $TiCl_4$ both being introduced through standard 1½ inch Sch. 40 pipe as in Example I. After 2 hours of operation, the tubes 31, 32, and 33 plug at the opening into the reactor due to oxide growth and formation. A typical $TiO_2$ product sample during the run has an average tinting strength (Reynolds Scale) of 1,525.

Although this invention has been described with particular reference to titanium tetrahalide, particularly titanium tetrachloride, it may be employed in the production of other pigmentary metal oxides.

The term "metal" as employed herein is defined as including those elements exhibiting metal-like properties, including the metalloids. Examples, not by way of limitation, but by way of illustration, of pigmentary metal oxides which may be produced by the aforementioned process are the oxides of aluminum, arsenic, barium, beryllium, boron, calcium, gadolinium, germanium, hafnium, lanthanum, lithium, magnesium, iron, phosphorus, potassium, samarium, scandium, silicon, sodium, strontium, tantalum, tellurium, terbium, thorium, thulium, tin, titanium, yttrium, ytterbium, zinc, zirconium, niobium, gallium, antimony, lead, and mercury.

Likewise, it is to be understood that any of the above teachings may be employed in any vapor phase oxidation process for providing a pigmentary metal oxide either in the absence or presence of a fluidized bed.

Obviously, many modifications and variations of the present invention are possible in light of the above teachings.

We claim:

1. Apparatus for introducing gas from a gas supply means into the space formed between concentric tubes having coextensively parallel walls, said space between said walls being closed at one end and open at the other end, comprising conduit means having a narrow end connected to said gas supply means and an outlet opening adjacent said space between said walls, said narrow end of said conduit and said gas supply means having the same cross-sectional area and shape at the connection therebetween, said conduit being connected to said space at a location closer to said closed end than said open end and with its axis being disposed at an angle of from 45° to 135° to the axes of said tubes, the cross-sectional area and mean diameter of said conduit means uniformly increasing from 1.5 to 40 times over a linear distance of from 1 to 20 feet as it approaches said space throughout the extent thereof from the point at which said narrow end is connected to said gas supply means to the outlet opening adjacent said space between said walls to thereby provide a uniform flow pattern parallel to the common axis of said concentric tubes and a substantially uniform gas distribution from the open end of said space.

2. Apparatus according to claim 1 wherein the conduit has a rectangular cross-section.

3. Apparatus according to claim 1, wherein said conduit to positioned with its axis disposed at an angle of about 90° to the axes of said tubes.

4. Apparatus according to claim 3 wherein the concentric tubes are substantially vertical.

5. Apparatus according to claim 3 wherein the mean diameter of said conduit means at the point of connection to said space is about the diameter of the outermost concentric tube.

* * * * *